INVENTORS
CEDRIC D. WEAVER
BY STUART L. HAYWARD

Orland M. Christensen
ATTORNEY

United States Patent Office 3,291,052
Patented Dec. 13, 1966

3,291,052
GEAR PUMPS AND MOTORS
Cedric D. Weaver, Shurdington, near Cheltenham, and Stuart L. Hayward, Cheltenham, England, assignors to Dowty Hydraulic Units Limited, Cheltenham, England, a British company
Filed Feb. 15, 1965, Ser. No. 432,525
Claims priority, application Great Britain, Feb. 27, 1964, 8,231/64
6 Claims. (Cl. 103—5)

This invention relates to gear pumps and motors.

According to this invention there is provided a tandem gear pump or motor unit comprising a common centre block carrying bushings for the gears of both pumps or motors of the unit, closure casings, one for each pump or motor, fitting upon the centre block and respectively carrying the other bushings of the pumps or motors, which other bushings are urged in a direction towards the centre block by delivery pressure (in the case of pumps), or supply pressure (in the case of motors), thereby substantially to afford fluid sealing between the engaging faces of the bushings and gears on each side of the centre block.

The bushings on each side of each gear pump or motor may be separate or they may be formed from a single block.

The centre block may be of die-cast material, the bushings carried thereby being of different material from the block, but cast therewith.

One of the gear pumps or motors may be of larger capacity than the other by providing the gears of that pump with teeth of greater width.

The unit may have a single input or output shaft formed with or connected to one gear only, and in this case the gear with which that gear meshes is connected by a bar passing through the centre block to its corresponding gear co-axial therewith on the other side of the centre block, the remaining gear, which is co-axial with the shaft, being in mesh with said corresponding gear but having no direct connection through the centre block with the shaft.

The two gears which are coupled together may be so internally axially apertured in such a cross-sectional shape as to both receive the end portions of the connecting bar which is of complementary cross-section. The bar may be of hexagonal cross-section and incorporate clip means at a point intermediate its length to locate the bar in the axial sense.

Figure 1:
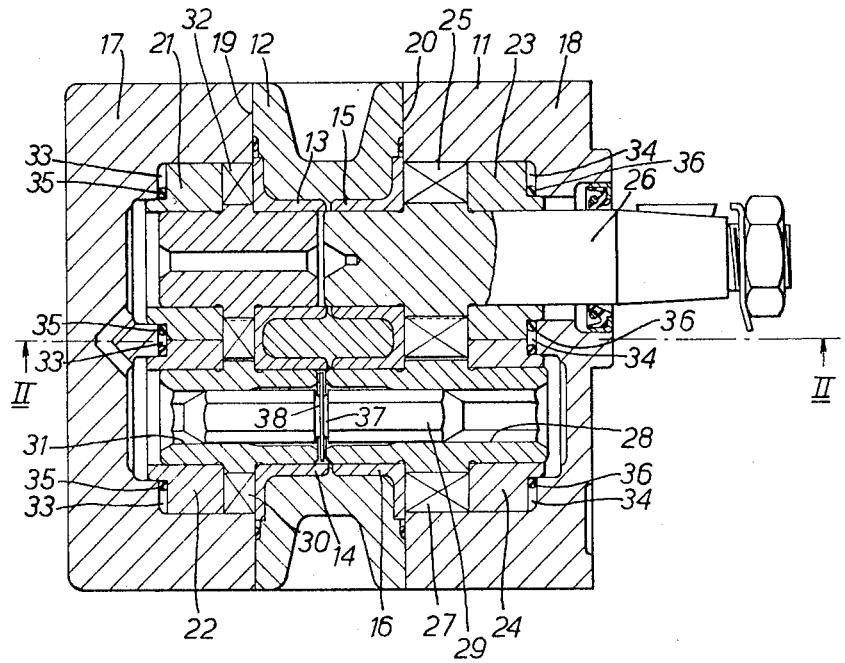
Figure 2:
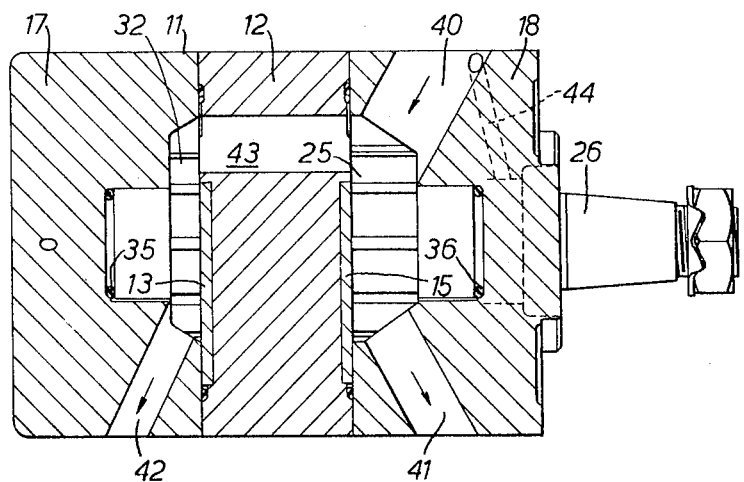

One embodiment of this invention will now be particularly described by way of example with reference to the accompanying drawings, of which, FIGURE 1 shows a tandem gear pump in cross-section, and, FIGURE 2 is a section taken along the line II—II upon FIGURE 1.

Referring to the drawings, a tandem gear pump unit 11 comprises a centre block 12 of die-cast aluminium having bushings 13, 14, 15 and 16 of lead bronze formed cast therewith. The bushings 13 and 14 are formed integrally, as are the bushings 15 and 16 also.

Closure casings 17 and 18 respectively fit upon the side faces 19 and 20 of the centre block 12 being secured by a suitable number of set bolts (not shown).

The closure casing 17 houses a pair of bushings 21 and 22, while the closure casing 18 houses a pair of bushings 23 and 24.

The bushings 15 and 23 support a driving gear 25 for rotation, this gear being formed integrally with an input shaft 26 for the tandem gear pump unit. The gear 25 meshes with a gear 27 mounted for rotation in the bushings 16 and 24. The gear 27 is internally broached at 28 to provide an aperture therethrough of hexagonal cross-section. This aperture receives the end portion of a bar 29, also of hexagonal cross-section, which thereby drivingly connects the gear 27 with a gear 30 which is supported for rotation in the bushings 14 and 22, co-axially with the gear 27, the other end portion of the bar 29 fitting into the aperture 31 of the gear 30, which like the aperture 28 is of hexagonal cross-section.

The teeth of the gear 30 are in mesh with the teeth of a gear 32 which is carried for rotation in the bushings 13 and 21, being co-axial with the driving shaft 26.

Thus, the tandem gear pump unit 11 comprises two pumps, the one to the right of the centre block 12 in the drawing having gears whose teeth are of greater width than the pump to the left of the centre block, so that the pump to the right is of greater capacity than that to the left.

The bushings 21, 22, 23 and 24 are so mounted with respect to their closure casings 17 and 18 as to be slidable in a direction towards the centre block 12. Pressure chambers 33 and 34 are formed respectively adjacent the end faces of the bushings 21, 22, and 23, 24. These chambers are bounded by sealing rings 35 and 36 respectively.

The hexagonal bar 29 is recessed at 37 at its centre portion and is there provided with a circlip 38 which forms a stop in the axial sense for the bar. The fit of the hexagonal bar 29 in the gears 27 and 30 is such as to afford a degree of flexibility in the drive from the pump to the right of the centre block 12 to the pump to the left of the centre block.

The closure casing 18 is provided with a common liquid inlet 40 for the two pumps, and also with a liquid outlet 41 for the pump to the right of the centre block 12. The closure casing 17 is provided with a liquid outlet 42 for the pump to the left of the centre block. A connecting passageway 43 is provided in the centre block 12 so that liquid passing through the inlet 40 and to the pump to the right of the centre block can also pass to the inlet side of the pump to the left of the centre block.

In operation of the pump, the end faces of the bushings 21, 22, 23 and 24 remote from the centre block 12 are subjected to pump delivery pressure which in a manner not shown in the drawing is transmitted to the chambers 33 and 34. These chambers are of such area and of such shape in relation to the end faces of the bushings, and the pressures acting elsewhere on the bushings are such that a pressure differential is created which urges the bushings in the direction towards the centre block 12 so as to hold the gears in substantial sealing engagement with their respective bushings, the engaging forces, however, being such that whilst adequate sealing is maintained, excessive friction with undue generation of heat is not set up. Further, the shape of the chambers are such that in conventional manner any tilting tendency of the bushings is avoided.

A passageway 44 is provided in the closure casing 18 and is connected to the liquid inlet 40 so that, in a manner not shown, portions of the bushings 21, 22, 23 and 24 are placed in communication with the inlet side of the pump. Further, internal leakage within the pump is conducted to the inlet through this passageway 44.

By the invention, a compact tandem pump unit is provided, the composite centre block construction being such as to require only straightforward machining operations, which result in relatively cheap production. The use of an hexagonal bar 29 also cheapens production because it can be parted-off straight from hexagonal bar stock.

By taking the drive from one pump to the other through the idler gears 27 and 30, it is only necessary to broach these gears, which is a relatively straightforward matter, rather than broach the driving gear and its shaft, as might otherwise be the case, if the drive was taken to the second pump direct from the drive shaft to the second driving gear.

Although in the embodiment described, the bushings in the centre block have been integrated in pairs, while the bushings carried by the closure casings have been separate, in alternative embodiments of the invention all the bushings are separate, or alternatively, the bushings are all formed in integral pairs, or again, the bushings in the closure casings are formed in integral pairs, while the bushings in the centre block are separate.

Again, in an alternative embodiment, the invention is with advantage employed in a gear motor where two sources of pressure fluid are combined into the motor unit, the single output shaft being rotatable under all the fluid power supplied, or only under a portion of it.

In another embodiment, two output shafts are instead provided in a tandem gear motor, in this case the coupling bar from one motor to the other being omitted and thus the motors being operable independently, but compactly having a common centre casing.

The centre block and bushings are not limited to die-cast aluminium and lead bronze respectively, as in other embodiments of the invention, other suitable materials ar used, whether the bushings are cast with the centre block or not.

We claim as our invention:

1. A tandem gear pump or motor unit comprising a common centre block carrying bushings for the gears of both pumps or motors of the unit, closure casings, one for each pump or motor, fitting upon the centre block and respectively carrying the other bushings of the pumps or motors, which other bushings are so constructed as to be capable of being urged in a direction towards the centre block by delivery pressure, (in the case of pumps) or supply pressure (in the case of motors), thereby substantially to afford sealing between the engaging faces of the bushings and gears on each side of the centre blocks, said unit being provided with a single input or output shaft formed with or connected to one gear only, the gear with which said one gear meshes being connected by a bar passing through the centre block to its corresponding gear co-axial therewith on the other side of the centre block, and the remaining gear which is co-axial with the shaft being in mesh with said corresponding gear but having no direct connection through the centre block with the shaft, and said bar incorporating clip means at a point intermediate its length to locate the bar in the axial sense.

2. A tandem gear pump or motor unit as claimed in claim 1, wherein the bushings on each side of each gear pump or motor are separate.

3. A tandem gear pump or motor unit as claimed in claim 1, wherein the centre block is of die-cast material, the bushings carried thereby being of different material from the block but cast therewith.

4. A tandem gear pump or motor unit as claimed in claim 1, wherein one of the gear pumps or motors is of larger capacity than the other, the gears of the larger capacity pump having teeth of greater width than those of the other pump or motor.

5. A tandem gear pump or motor unit as claimed in claim 1, wherein the two gears which are coupled together are so internally axially apertured in such a cross-sectional shape as respectively to receive one end portion and the other end portion of the connecting bar which is of complementary cross-section.

6. A tandem gear pump or motor unit as claimed in claim 1, wherein the bar is of hexagonal cross section.

References Cited by the Examiner

UNITED STATES PATENTS

| | | | |
|---|---|---|---|
| 1,843,246 | 2/1932 | Sloane | 103—126 |
| 2,202,913 | 6/1940 | Johnson | 103—126 |
| 2,412,588 | 12/1946 | Lauck | 103—126 |
| 2,778,246 | 1/1957 | Thornton | 64—28 |
| 2,969,019 | 1/1961 | Lorenz et al. | 103—5 |
| 3,101,673 | 8/1963 | Clark et al. | 103—126 |
| 3,146,716 | 9/1964 | Dreisin | 103—2 |

MARK NEWMAN, *Primary Examiner.*

W. J. KRAUSS, *Assistant Examiner.*